United States Patent
Zandee et al.

[11] Patent Number: 5,872,895
[45] Date of Patent: Feb. 16, 1999

[54] METHOD FOR OBJECT BASED COLOR MATCHING WHEN PRINTING A COLOR DOCUMENT

[75] Inventors: James C. Zandee, Santa Clara; Randall G. Guay, Cupertino, both of Calif.

[73] Assignee: Apple Computer, Inc., Cupertino, Calif.

[21] Appl. No.: 315,155

[22] Filed: Sep. 29, 1994

[51] Int. Cl.$^6$ ............ B41B 15/00; G06F 15/00; G03F 3/08; H04N 1/46

[52] U.S. Cl. ............ 395/109; 358/518; 358/538

[58] Field of Search ............ 395/109, 117, 395/112, 115, 116, 101; 358/462, 515, 467, 518, 538, 534, 540, 530, 448, 450; 382/175–176

[56] References Cited

U.S. PATENT DOCUMENTS

| | | | |
|---|---|---|---|
| 5,079,638 | 1/1992 | Kishi et al. | 358/462 |
| 5,081,596 | 1/1992 | Vincent et al. | 395/109 |
| 5,243,691 | 9/1993 | Kuwabara et al. | 395/117 |
| 5,257,097 | 10/1993 | Pineau et al. | 358/500 |
| 5,315,691 | 5/1994 | Sumiya et al. | 395/109 |
| 5,432,620 | 7/1995 | Watanabe et al. | 358/462 |
| 5,579,446 | 11/1996 | Naik et al. | 395/109 |
| 5,704,021 | 12/1997 | Smith et al. | 395/109 |

FOREIGN PATENT DOCUMENTS

| | | |
|---|---|---|
| 0606781 | 12/1993 | European Pat. Off. . |
| 0665676 | 1/1995 | European Pat. Off. . |

OTHER PUBLICATIONS

Desk Jet 500C Printer Software Information Guide. Hewlett–Packard, Sep. 1991 pp. 2–32 to 2–35.

Christopher O'Malley, "Color Printing Gets Smarter Hues," by Compuer Shopper, Jun. 1994, p. 355.

*Primary Examiner*—Dwayne D. Bost
*Assistant Examiner*—Tracy M. Legree
*Attorney, Agent, or Firm*—Nancy R. Simon

[57] ABSTRACT

A method for object based color matching when printing color documents. Objects are anything that can be drawn, and include text, rectangle, oval, region, polygon, and Pix-Maps. Color matching is performed on each object in a page prior to rendering the object into a pixel map. This is accomplished by setting up multiple concurrent color matching sessions that have different rendering intents. Depending upon the object type, a color matching session with a particular rendering intent is used to perform color matching on the object.

12 Claims, 6 Drawing Sheets

FIGURE 1

| Field | Description |
|---|---|
| device | Device-specific information |
| portPixMap 26 | Handle to a pixel map |
| portVersion | Flags |
| grafVars | Handle to additional color fields |
| chExtra | Extra width added to nonspace characters |
| pnLocHFrac | Fractional horizontal pen position |
| portRect | Port rectangle |
| visRgn | Visible region |
| clipRgn | Clipping region |
| bkPixPat | Background pattern |
| rgbFgColor | Requested foreground color |
| rgbBkColor | Requested background color    28 |
| pnLoc | Pen location |
| pnSize | Pen size |
| pnMode | Pattern mode |
| pnPixPat | Pen pattern |
| fillPixPat | Fill pattern |
| pnVis | Pen visibility |
| txFont | Font number for text |
| txFace | Text font style |
| txMode | Text source mode |
| txSize | Font size for text |
| spExtra | Extra width added to space characters |
| fgColor | Actual foreground color |
| bkColor | Actual background color |
| colrBit | Color bit (reserved) |
| grafProcs 30 | Pointer to low-level drawing routines |

```
struct CM2 Header {                                 bytes
unsigned long      size;                            0-3
OSType             CMMType;                         4-7
NumVersion         profileVersion;                  8-11
OSType             profileClass;                    12-15
OSType             dataColorSpace;                  16-19
OSType             interchangeColorSpace            20-23
CMDateTime         dateTime;                        24-35
OSType             CS2profileSignature;             36-39
OSType             platform;                        40-43
unsigned long      flags;                           44-47
OSType             deviceManufacturer;              48-51
unsigned long      deviceModel;                     52-55
unsigned long      deviceAttributes[2];             56-63
unsigned long      renderingIntent;                 64-67
FixedXYZColor      white;                           68-79
char               reserved[36];/*for future        80-127
                   use*/};
```

FIGURE 5

METHOD FOR OBJECT BASED COLOR MATCHING WHEN PRINTING A COLOR DOCUMENT

BACKGROUND OF THE INVENTION

1. Field of the Invention

The present invention relates to printing color documents, and more particularly to performing color matching when printing color documents. Still more particularly, the present invention relates to a method for object based color matching when printing color documents.

2. Description of the Prior Art

As color input, display and output devices for computer systems proliferate, the need for color management increases. This is due to several factors. First, differing device types operate in different color spaces. For example, color monitors typically display colors as combinations of red, green, and blue, and are said to work in the RGB color space. Printers typically print images as combinations of cyan, magenta, yellow and black, and are said to work the CMYK color space.

The way colors are sampled in different devices is another factor. Generally, the method used by monitors and scanners to capture color follows the laws of additive color mixture. Additive color mixture adds the color together to yield the result. Additive color mixture moves a color toward white, and usually results in vivid images. Printers, however, typically follow the laws of subtractive color mixture. In subtractive color mixture, color data specifies how much of a certain color to remove from white to yield the result. Consequently, a subtractive color mixture moves colors toward black or dark gray.

Furthermore, different color devices have different color capabilities. Every color device, such as a scanner, printer, or monitor, has a range of colors that it can produce. This range of produceable colors is known as a gamut. Those skilled in the art will recognize that color monitors can produce and display hundreds to thousands of colors. Color printers also produce a range of colors. However, printer colors typically do not coincide with the colors on a monitor. Consequently, in most situations, the gamut for a color monitor only partially overlaps the gamut for a color printer. As a result, some colors displayed on a color monitor can not be produced by a color printer.

Finally, devices of the same type that are manufactured by different manufacturers may produce different colors, or intensities of the same colors, for the same color data. For example, color monitors made by different manufacturers may display different colors, or intensities of the same colors, for the same RGB values. Print technologies vary drastically, and the gamut that an ink jet color printer can print may be quite different from a printer based on a different technology, such as a color laser printer. A single printer may have a fluctuating gamut depending on the paper or ink being used at the time of printing.

Color matching typically means converting colors between differing gamuts. Most current color management systems match colors pursuant to a rendering intent. A rendering intent affects the way colors are matched by causing the colors to be matched with a particular use in mind. For example, a document that will be used for business purposes is generally printed with saturated colors. The user is not concerned with matching the printed colors as close as possible to the original colors. Saturated colors when printed are typically vivid colors. This type of rendering intent is known as business/graphics.

Another type of rendering intent is photographic. A document that is, or includes, a photograph may be printed with colors that are matched perceptually. Photographic rendering intent attempts to give the best overall match of colors.

Objects are anything that can be drawn, and include text, rectangle, oval, region, polygon, and PixMaps. Unless each object is individually tagged with a rendering intent, most current color management systems typically match colors in a document using only one rendering intent. They do not allow a user to print individual pages within a document with different rendering intents. They also do not allow colors to be matched on a single page with different rendering intents. This can create problems for documents or pages that contain photographs and text or charts. The user can print the document with a business/graphics rendering intent, but the photographs within the document will typically look dark, and the colors within the printed photographs will not match the original colors very closely. Alternatively, the user can print the document with a photographic rendering intent, but the text and charts within the document will typically print with less saturated colors. These two alternatives are inadequate and unsatisfactory for many users, such as graphic artists or business persons.

SUMMARY OF THE INVENTION

A method for object based color matching when printing color documents. Objects are anything that can be drawn, and include text, rectangle, oval, region, polygon, and PixMaps. Color matching is performed on each object on a page prior to rendering the object into a pixel map. This is accomplished by setting up multiple concurrent color matching sessions that have different rendering intents. Depending upon the object type, a color matching session with a particular rendering intent is used to perform color matching on the object. In the preferred embodiment, if the object is a PixMap, color matching is perfomed using a photographic rendering intent. Color matching for all other types of objects preferably uses a business/graphics rendering intent.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
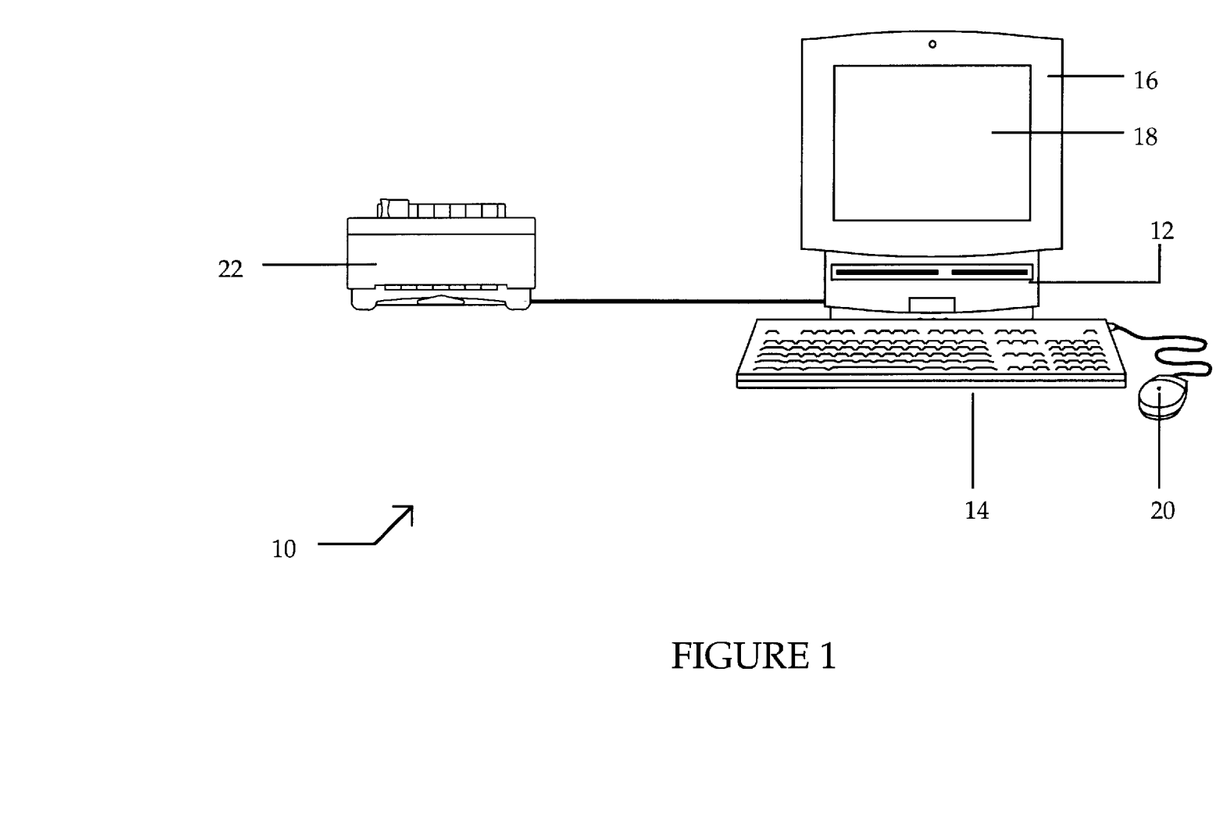
FIG. 1 is a pictorial illustration of a computer system which may be used to implement a method of color matching based upon objects according to the present invention.

With reference now to the figures and in particular with reference to FIG. 1, a computer system is illustrated which may be used to implement the method for object based color matching according to the present invention. Computer system 10 includes a computer 12, keyboard 14, a color monitor 16 having a display screen 18, a cursor control device 20, shown here as a mouse, and a printer 22. Computer system 10 may be implemented using any suitable computer, such as a Macintosh Quadra™ computer, a product of Apple Computer, Incorporated, located in Cupertino, Calif. Printer 22 is a color printer, such as a Color Stylewriter Pro™ printer, also a product of Apple Computer, Incorporated.

In computer system 10 the term "image" is used to refer to a viewable image, i.e., an image as it is displayed on a display or printed on a page. The minimum information required to produce the image is typically stored in a pixel map. That is, all information concerning a particular pixel (intensity, color, etc.) is stored in a memory to "map" the information to that particular pixel. Other information available in computer 12 is information concerning the "objects" of a document or page that are used to ultimately create the image. In the preferred embodiment, objects are anything that can be drawn, and include text, rectangle, oval, region, polygon, and PixMaps. PixMaps contain pixel data, and one example of a PixMap is a photographic image.

Figure 2:
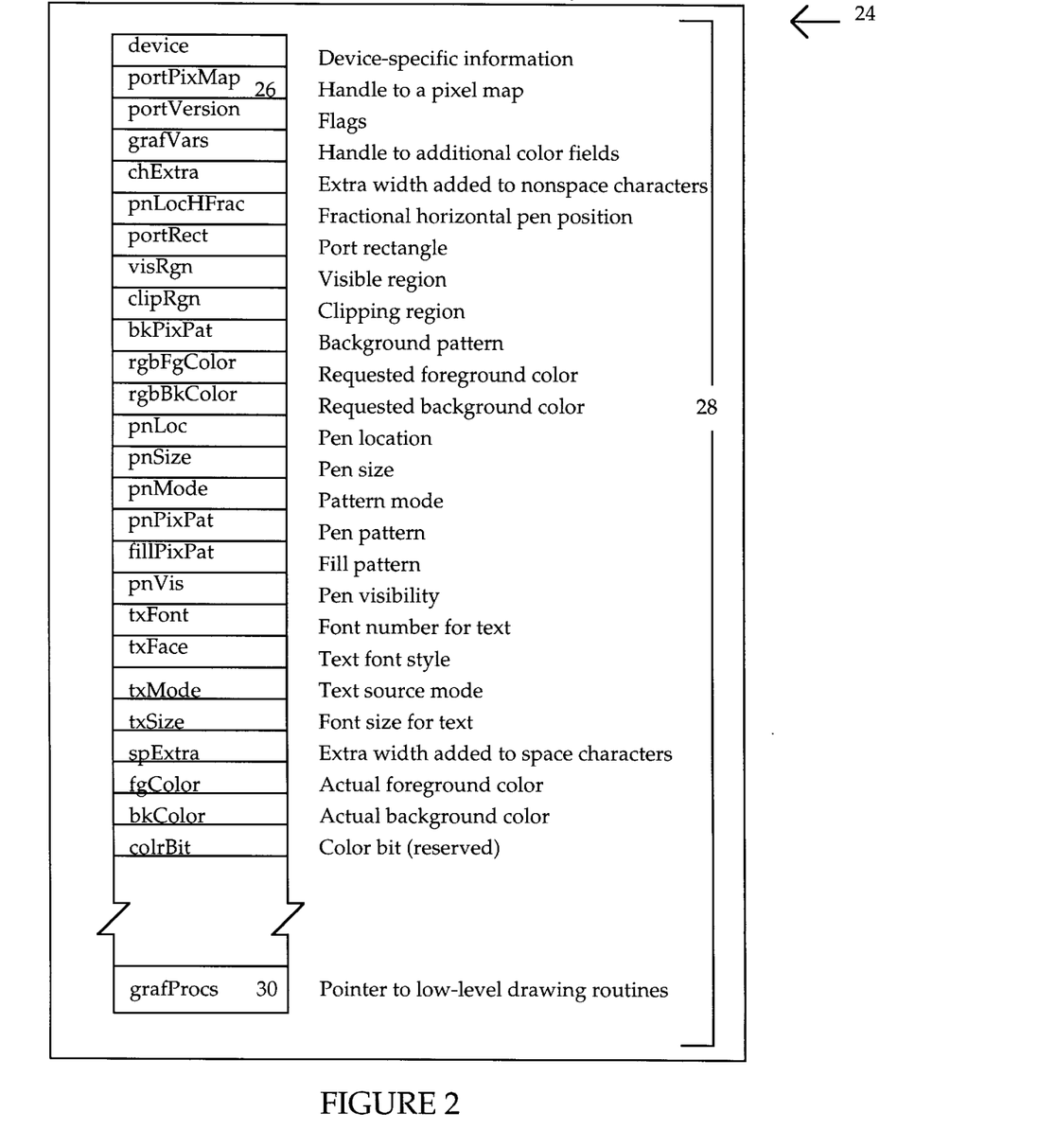
FIG. 2 depicts a data structure of type "CGrafPort", a preferred format of a page or document according to the present invention.

The preferred format of a page or document for the present invention is a "CGrafPort", as shown in FIG. 2. The CGrafPort 24 is a drawing environment that contains the information needed in order to transmit drawing operations from bits in memory to pixels on screen display 18. CGrafPort 24 contains a pointer 26 to the port's pixel map along with other information 28 regarding the color image. For example, CGrafPort 24 includes information about the visible region, any clipped region, the font, and background color.

The same routines that are used by an application to display an image are used to print an image in the preferred embodiment. An image is printed by drawing the image into a printing graphics port using Color QuickDraw™ low-level drawing routines. The "GrafProcs" field 30 of CGrafPort 24 comprises the low-level routines that are used to draw the image.

A printing graphics port is a data structure of type "TPrPort", and is a printing environment which contains CGrafPort 24 plus additional information used by the printer driver and system software. Examples of such additional information include the size of the paper and GrafProcs 30. For more information on CGrafPort 24 and GrafProcs 30, see *INSIDE MACINTOSH: Imaging with QuickDraw* (1994) by Apple Computer, incorporated.

Referring again to FIG. 1, a printer driver renders images in computer 12 using drawing commands, and then sends the rendered images to printer 22 in the form of pixel maps. A printer driver captures the images of an entire page in a temporary disk file, called a spool file, or in memory in the preferred embodiment. This is accomplished by using low-level drawing routines to draw the images into a printing graphics port. As each page of a document is drawn into the printing graphics port, the printer driver translates the commands into the equivalent instructions for the printer, essentially translating the pixel maps into dot-placement instructions. These instructions are then sent to the printer, and the printer prints the images onto the page.

One advantage of having the printer driver control printing is that it introduces greater flexibility into the printing process. The printer driver can examine entire pages for their use of color, fonts, or other objects that need special processing prior to printing. Thus, the method for object based color matching preferably occurs before the printer driver renders the page into a pixel map. Alternatively, the method of the present invention can occur any time before an object is rendered into a pixel map.

The color management system used in the preferred embodiment is ColorSync™, a product of Apple Computer, Inc. The ColorSync™ Utilities are a set of routines and data structures that enable computer system 10 to match colors and communicate color information between various devices. Color matching is necessary in computer system 10 for a variety of reasons, such as color devices having different color gamuts, describing color in different terms, and operating in different color spaces.

The ColorSync™ Utilities provide applications or device drivers with several tools for matching colors between devices. The tools include a default system color profile that describes the gamut of the Apple™ RGB 13 inch monitor, a control panel interface by which users can set their system profile, a means of specifying and obtaining profiles for other devices, a means of associating profiles with images or documents, an Apple-supplied default color matching method (CMM), a folder for storing profiles, and an open architecture that allows developers to create or obtain a custom CMM and associate it with a profile. Because the ColorSync™ Utilities are designed to provide an "open system" for color management, users can use the Apple-supplied default CMM, create their own CMM, or obtain them from companies or vendors who create CMMs.

Color information is transmitted between devices in computer system 10 via profiles. A profile is a data structure that describes the basic color characteristics of a device. Color information described in a profile includes data relating to a preferred CMM, rendering intent, and the device's color space, gamut, tonal reproduction curves. Profiles can reside in files, device drivers, applications, images, and documents.

Figure 3A:
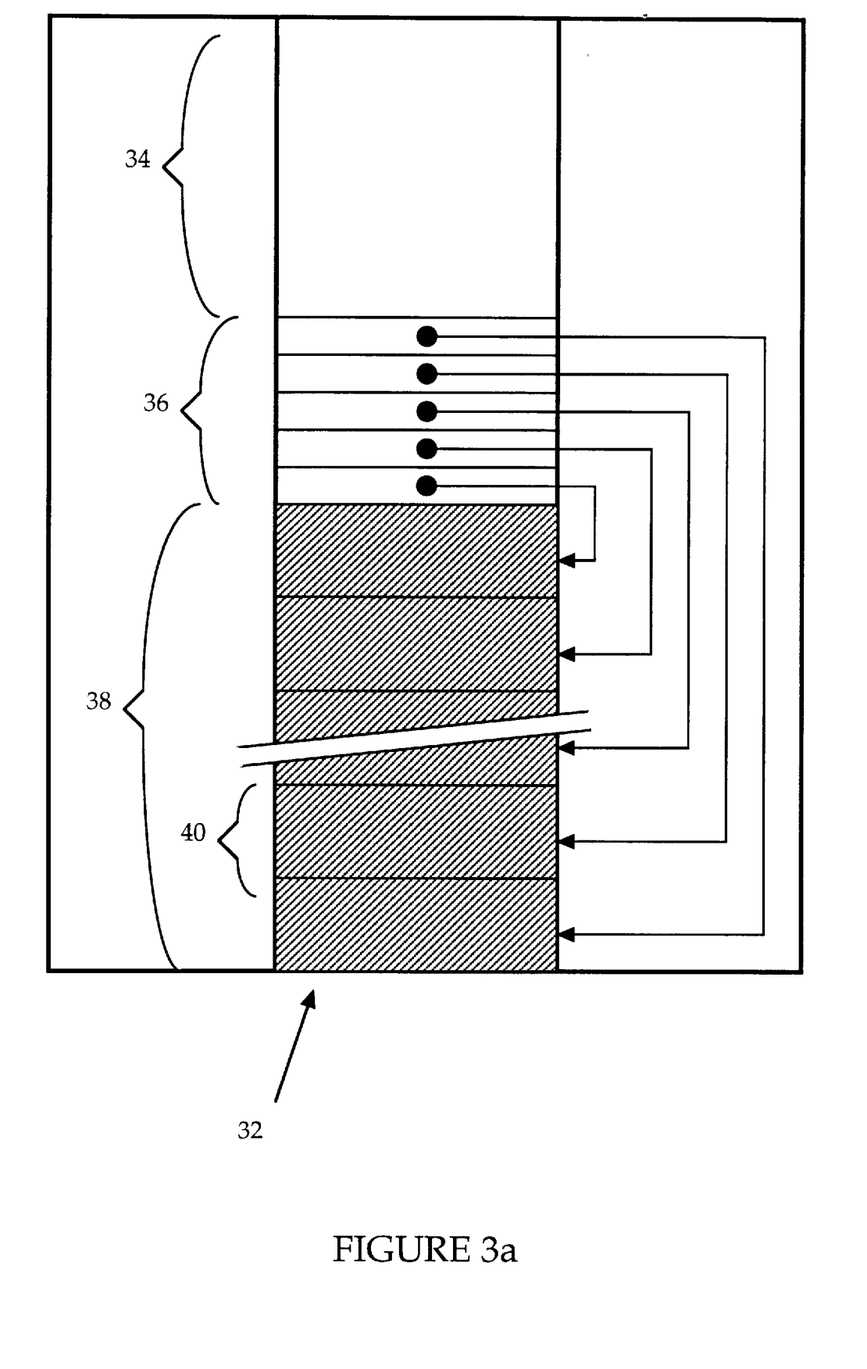
FIG. 3a is a pictorial representation of a profile that is ColorSync™ compatible.
Figure 3B:
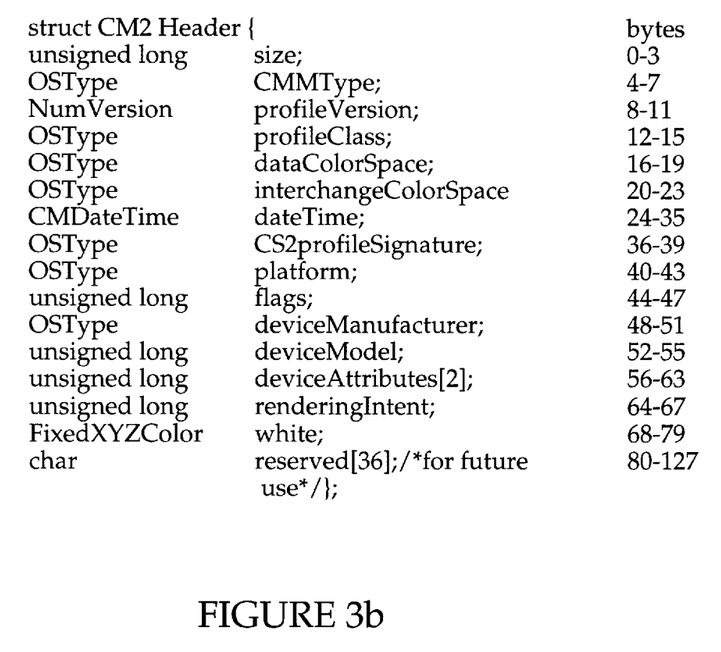
FIG. 3b illustrates a data structure for a header within a profile.

In the preferred embodiment, the profile is ColorSync™ compatible. FIG. 3a is a pictorial representation of a profile that is ColorSync™ compatible. A profile 32 contains at least three sections, a header 34, a tag table 36, and tagged element data 38. Header 34 defines a set of parameters at the beginning of profile 32. FIG. 3b illustrates the data structure for a header 34 within profile 32. The preferred contents and size for header 34 are shown in FIG. 3b.

As can be seen, header 34 includes information on a preferred CMM, a color space, and a device, such as its manufacturer and model. Preferably located at bytes 64–67 is "renderingIntent". This field is used to list a particular type of rendering intent for color matching. As is described later with reference to FIG. 5, a profile may be associated with an object. If so, color matching is performed on that object using the rendering intent specified in the profile.

Referring again to FIG. 3a, tag table 36 provides a table of contents to tagged element data 38 in profile 32. Tag table 36 preferably includes a tag signature, address and size for each tagged element data 38. A tag signature acts as a pointer to a specific element in tagged element data 38. In the preferred embodiment, a tag signature is defined as a four byte hexadecimal number.

Each tagged element data 38 is a piece of color information that a CMM can use to perform color matching or correction. Examples of tagged element data 38 include gray tone reproduction curve information and the tristimulus values for red, green, and blue. By using tag table 36, tagged element data 38 can be accessed randomly and individually. In this manner, a single element 40 within tagged element data 38 can be accessed and loaded into memory, thereby providing only the information necessary to perform a particular function or process of color matching or to present device information to a user.

A CMM implements an algorithm that determines how to match colors. A rendering intent affects the way colors are matched by causing the colors to be matched with a particular use in mind. For example, one type of rendering intent is business/graphics. Matching colors with this type of rendering intent means a document is generally printed with saturated colors. Another type of rendering intent is photographic. Matching color with a photographic rendering intent means the colors are matched as close as possible to the original colors while preserving the overall tone of the image. Although the preferred embodiment uses only business/graphics and photographic rendering intents, there are other rendering intents which are known in the art and which may be incorporated into the present invention by those skilled in the art.

As discussed earlier, unless each object is individually tagged with a rendering intent, colors are matched in a document using only one rendering intent. A user can not print individual pages within a document using different rendering intents for each page, or print individual pages using different rendering intents on the same page. This can create problems for documents or pages that contain photographs and text or charts.

Figure 4:
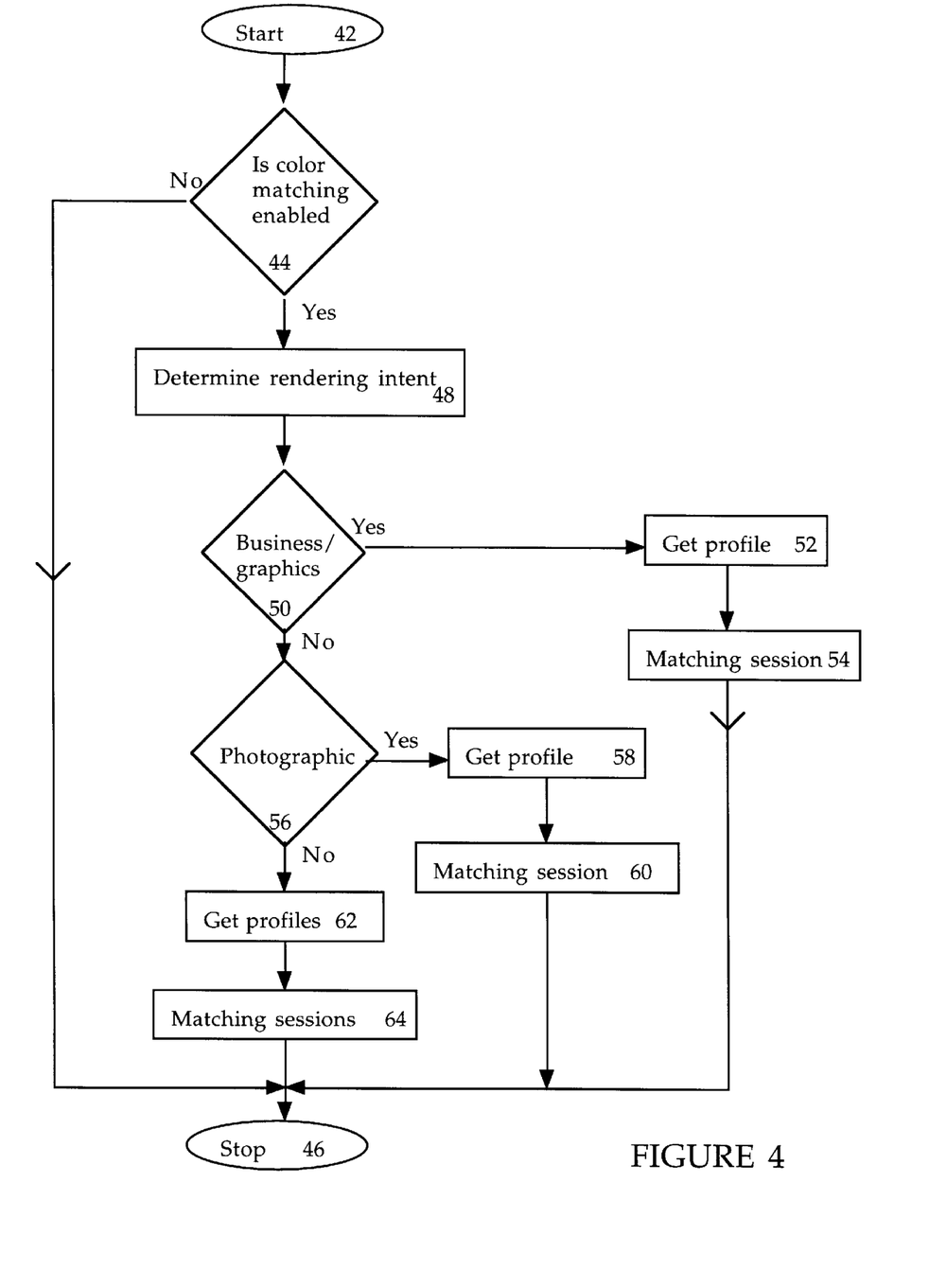
FIG. 4 is a flowchart depicting a method of object based color matching when printing color documents according to the present invention.

FIG. 4 is a flowchart depicting a method of object based color matching when printing color documents according to the present invention. The method begins at block 42, with a document or page to be printed. Next, a decision is made as to whether or not color matching is enabled. This step is depicted in block 44. In the preferred embodiment, color matching is performed using the ColorSync™ Utilities. If color matching is not enabled, the method ends, as shown in block 46, and the document or page is printed without object based color matching.

If color matching is enabled, the method continues at block 48, with a determination as to the type of rendering intent the user has selected. In the preferred embodiment, the user can select between business/graphics, photographic or automatic rendering intents. For object based color matching, the user needs to select the automatic rendering intent. Selection is accomplished preferably by a user interface implemented by an application or printer driver.

A decision is then made as to whether or not the user has selected business/graphics as the rendering intent. This step is shown in block 50. If the user has selected business/graphics, block 52 illustrates the step of obtaining the profile for that type of matching. Next, one color matching session is initiated, as shown in block 54. The color matching session utilizes the profile obtain in the previous step, block 52. In this situation, all color matching for a page or document uses a business/graphics rendering intent. The method then ends at block 46.

If the user has not selected business graphics, a decision is then made as to whether or not the user selected photographic, as shown in block 56. If the user has selected photographic, the profile for that type of color matching is obtained. This step is depicted in block 58. Next, one color matching session is initiated, as shown in block 60, using the profile obtained in the previous step. All color matching for a page or document uses a photographic rendering intent. The method then ends at block 46.

If a user has not selected a business/graphics or photographic rendering intent, this leaves only automatic as the selected rendering intent in the preferred embodiment. In this case, the user desires to use object based color matching when printing a color document. Block 62 illustrates the next step, in which preferably two profiles are obtained. One of the profiles has a rendering intent for business/graphics, the other profile has a photographic rendering intent.

Using these two profiles, two concurrent color matching sessions are set up. The two color matching sessions are initiated in the preferred embodiment by making two ColorSync™ API commands, "CWNewColorWorld( )" and "SetProfile( )". This step is shown in block 64. These two matching sessions are used until all of the pages or documents are printed. The method then ends at block 46.

Figure 5:
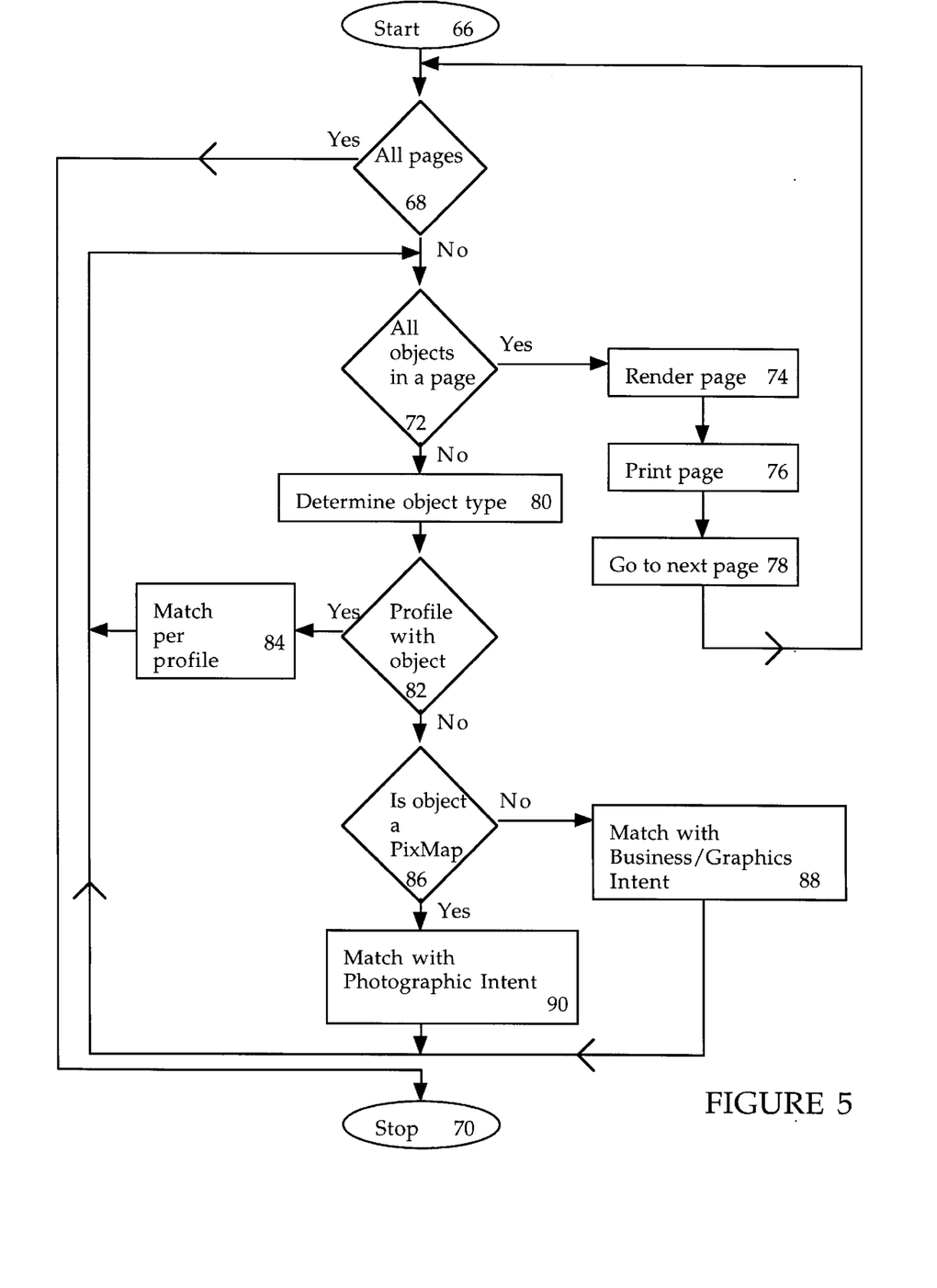
FIG. 5 is a flowchart further illustrating the method of block 64 in FIG. 4 for object based color matching when printing color documents according to the present invention.

Referring to FIG. 5, a flowchart further illustrates the method of block 64 in FIG. 4 for object based color matching when printing color documents according to the present invention. The method begins at block 66, and thereafter passes to block 68. Block 68 depicts a decision as to whether or not all of the pages have been printed. If all of the pages have been printed, the method ends at block 70. If all of the pages have not been printed, a decision is then made as to whether or not all of the objects within a single page have been captured. This step is shown in block 72. If all of the objects on a page have been captured, the page is rendered, as shown in block 74. Next, the page is printed, as illustrated in block 76. The process then moves on to the next page, as shown in block 78, and returns to block 68.

Referring again to block 72, if all objects are not captured for a page, an object is received by the printer driver and the object type for the object is determined, as illustrated in block 80. In the preferred embodiment, an object type is determined by which GrafProc (see 30 FIG. 2) is used to draw the object.

Next, a decision is made as to whether or not the object has a profile associated with it. This step is shown in block 82. If the object does have a profile associated with it, color matching is performed for the object pursuant to the profile's rendering intent, as depicted in block 84. In the preferred embodiment, color matching is performed by ColorSync™. The process then returns to block 72.

If a profile is not associated with an object, block 86 illustrates a decision as to whether or not the object is a PixMap. If the object is not a PixMap, color matching is performed on that object using a business/graphics rendering intent. This step is shown in block 88. If the object is a PixMap, color matching is performed on the object using a photographic rendering intent, as shown in block 90. The method then returns to block 72.

By performing color matching on an object instead of a page or document, pages or documents that contain text, photographs and charts can be printed with optimum color matching. Furthermore, a user can select from a collection of rendering intents when printing a page or document, providing the user with increased flexibility. Finally, the method of object based color matching does not impact the operation of a color management system, such as ColorSync™, but instead compliments it. For example, the process of embedding profiles into an image, page or document is still available to a user, along with the ability to perform object based color matching.

While the invention has been particularly shown and described with reference to a preferred embodiment, it will be understood by those skilled in the art that various changes in form and detail may be made therein without departing from the spirit and scope of the invention. Those skilled in the art will appreciate that certain steps described above can occur at different stages than described, or be added into the present invention. For example, instead of capturing all objects on a page and then rendering the entire page, each object can be rendered individually after color matching has occurred. Alternatively, a user may want to have the capability of performing object based color matching with other rendering intents in addition to business/graphics and photographic.

What is claimed is:

1. A method for performing color matching on at least one object on a page, comprising the steps of:

initiating at least two color matching sessions using ColorSync™, wherein each color matching session has a rendering intent that differs from the rendering intent of any other color matching session;

determining an object type for an object;

based upon the object type, performing a color matching session on the object using one of the at least two color matching sessions, wherein the selected color matching session has a particular rendering intent for that object; and for any remaining objects on the page, repeating until all objects on the page have been color matched the steps of determining an object type for an object and based upon the object type, performing a color matching session on the object using one of the at least two color matching sessions, wherein the selected color matching session has a particular rendering intent for that object.

2. The method of claim 1, wherein the step of determining an object type for each object comprises the step of determining a drawing routine used to render each object.

3. The method of claim 1, wherein the step of performing a color matching session on each object occurs before each object is rendered.

4. The method of claim 1, wherein the step of initiating at least two color matching sessions comprises the step of initiating a first color matching session that has a business/graphics rendering intent and a second color matching session that has a photographic rendering intent.

5. The method of claim 1, further comprising the steps of:

before performing the step of initiating at least two color matching sessions, determining if a profile is associated with an object; and if a profile is associated with the object, performing a color matching session on the object using the associated profile.

6. A system for performing color matching on at least one object on a page, comprising:

means for initiating at least two color matching sessions using ColorSync™ wherein each color matching session has a rendering intent that differs from the rendering intent of any other color matching session;

means for determining an object type for an object;

based upon the object type, means for performing a color matching session on the object using one of the at least two color matching sessions, wherein the selected color matching session has a particular rendering intent for that object; and for any remaining objects on the page, means for repeating until all objects on the page have been color matched the steps of determining an object type for an object and based upon the object type, performing a color matching session on the object using one of the at least two color matching sessions, wherein the selected color matching session has a particular rendering intent for that object.

7. The system of claim 6, wherein the means for determining an object type for each object comprises means for determining a drawing routine used to render each object.

8. The system of claim 6, wherein the means for initiating at least two color matching sessions comprises means for initiating a first color matching session that has a business/graphics rendering intent and a second color matching session that has a photographic rendering intent.

9. The system of claim 6, further comprising:

means for determining if a profile is associated with an object before the at least two color matching sessions are initiated; and if a profile is associated with the object, means for performing a color matching session on the object using the associated profile.

10. A system for performing color matching on at least one object on a page, comprising:

at least two rendering intents available for use in color matching; and means for initiating at least two color matching sessions using at least two of the rendering intents available for use in color matching, wherein ColorSync™ is used to initiate the at least two color matching sessions, and wherein a color matching session is performed on each object on the page using one of the at least two color matching sessions, wherein the color matching session used is determined by an object type associated with each object so that the selected color matching session has a particular rendering intent for a particular object.

11. The system of claim 10, wherein the at least two rendering intents available for use in color matching comprise a business/graphics rendering intent and a photographic rendering intent.

12. The system of claim 10, wherein the object type associated with each object comprises a drawing routine used to render the object.

* * * * *